(12) United States Patent
    Salinas et al.

(10) Patent No.: US 10,661,817 B2
(45) Date of Patent: May 26, 2020

(54) METHOD FOR DETERMINING THE LOCATION OF A RAILWAY VEHICLE AND ASSOCIATED SYSTEM

(71) Applicant: ALSTOM Transport Technologies, Saint-Ouen (FR)

(72) Inventors: Maximo Salinas, Melbourne, FL (US); Jared Cooper, Melbourne, FL (US); Nels Jorgensen, Melbourne, FL (US)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 131 days.

(21) Appl. No.: 15/910,284

(22) Filed: Mar. 2, 2018

(65) Prior Publication Data
    US 2019/0270465 A1    Sep. 5, 2019

(51) Int. Cl.
    *B61L 25/02*    (2006.01)
    *G01S 19/50*    (2010.01)
    *G01S 19/22*    (2010.01)

(52) U.S. Cl.
    CPC ............ *B61L 25/025* (2013.01); *G01S 19/22* (2013.01); *G01S 19/50* (2013.01); *B61L 2205/04* (2013.01)

(58) Field of Classification Search
    None
    See application file for complete search history.

(56) References Cited

U.S. PATENT DOCUMENTS

| | | | | |
|---|---|---|---|---|
| 7,436,354 B2* | 10/2008 | Lee | .................. | G01S 19/46 342/357.29 |
| 8,009,013 B1* | 8/2011 | Hirschfeld | .......... | G07C 9/00111 235/375 |
| 8,779,970 B1* | 7/2014 | Yeshayahu | ............ | G01S 5/0263 342/357.29 |
| 9,903,952 B2* | 2/2018 | Gentry | .................... | G01S 19/07 |
| 2002/0165699 A1* | 11/2002 | Ling | .................... | G06Q 10/107 702/187 |
| 2003/0216865 A1* | 11/2003 | Riewe | .................. | G01C 21/165 701/470 |
| 2012/0253663 A1* | 10/2012 | Hani | .................... | G01C 21/005 701/431 |
| 2013/0112815 A1* | 5/2013 | Tokumaru | ............. | B61L 25/025 246/124 |
| 2014/0070986 A1* | 3/2014 | Gao | ..................... | G01C 21/165 342/357.3 |

(Continued)

*Primary Examiner* — David P. Merlino
*Assistant Examiner* — Nicholas A Mahon
(74) *Attorney, Agent, or Firm* — Pearne & Gordon LLP

(57) ABSTRACT

The invention concerns a method for determining the location of a railway vehicle comprising a first navigation module determining a regular resolution position of the railway vehicle with a first accuracy measurement and a second navigation module determining a high resolution position of the railway vehicle with a second accuracy measurement, using the received signals. The method comprises the steps of determining a first confidence area around the regular resolution position, based on the first accuracy measurement, of determining a second confidence area around the high precision position, based on the second accuracy measurement, and of assigning a weight of confidence to the knowing of the actual location of the railway vehicle, by analyzing the overlay of the first and the second confidence areas and the first and the second accuracy measurements.

12 Claims, 3 Drawing Sheets

(56) References Cited

U.S. PATENT DOCUMENTS

2014/0375497 A1* 12/2014 Friend .................. G01S 19/14
                                                    342/357.51
2018/0173229 A1*  6/2018 Huang .................. H04W 4/70
2018/0257688 A1*  9/2018 Carter ................. G01R 33/072

* cited by examiner

METHOD FOR DETERMINING THE LOCATION OF A RAILWAY VEHICLE AND ASSOCIATED SYSTEM

BACKGROUND OF THE INVENTION

In the state of the art, it is common to use a global navigation satellite system such the Global Positioning System (GPS) for locating a railway vehicle such a locomotive or a metro. For this purpose, most of the modern railway vehicles comprise a navigation module able to receive and decode navigation signals issued from a satellite system. These navigation signals are usually publically available and provide a navigation solution with some predefined accuracy. Such solution is called "regular" or "low" resolution navigation solution. Generally, this solution is not sufficient for determine precisely the train location and notably, its position on one of the several parallel tracks in a multitrack railway system.

Additionally, in a multitrack system, determination of the precise track of the railway vehicle constitute an important, so called "vital", application for the railway traffic regulation. Moreover, as the vital applications concern the traffic safety, track information should be known with a high level of certainty.

For such vital applications, it is known to use two redundant navigation modules. However, the accuracy of a navigation solution obtained using the redundant navigation modules is not sufficient. Typically, the accuracy of the railway position determined by the redundant modules is not guaranteed to be better than +/−60 feet (approximately 18.3 meters) while the distance between the adjacent tacks can be less than 12 feet (approximately 3.7 meters).

Consequently, in order to distinguish vitally the tracks one from another, some additional information is required. For example, such information can be based on a track map, on an operator track number entry and/or on using preliminary logic calculations regarding position and direction of travel in conjunction with switch positions until the track is narrowed down to a single track possibility.

It is clear that such additional information is not always available and the necessity of its utilization increases the complexity and the cost of embedded equipment of the railway vehicle. It also increases the exploitation cost of the railway vehicle.

SUMMARY OF THE INVENTION

One aim of the invention is to provide a method for determining the location of a railway vehicle and an associated system which can determine the exact position of the railway vehicle using only navigation signals issued from one or several global navigation satellite systems without increasing the exploitation cost of the railway vehicle.

To this end, the invention concerns a method for determining the location of a railway vehicle comprising a first navigation module and a second navigation module, each navigation module receiving navigation signals from a global navigation satellite system;
  the first navigation module determining a regular resolution position of the railway vehicle with a first accuracy measurement, using the received signals;
  the second navigation module determining a high resolution position of the railway vehicle with a second accuracy measurement, using the received signals;
  the method comprising the following steps:
  determining a first confidence area around the regular resolution position, based on the first accuracy measurement;
  determining a second confidence area around the high precision position, based on the second accuracy measurement;
  assigning a weight of confidence to the knowing of the actual location of the railway vehicle, by analyzing the overlay of the first and the second confidence areas and the first and the second accuracy measurements.

According to one embodiment of the invention, during the step of assigning of a weight of confidence,
  a very high weight is assigned to the knowing of the actual location of the railway vehicle, if the first confidence area overlays the second confidence area, and both accuracy measurements are less than a predetermined threshold;
  a high weight is assigned to the knowing of the actual location of the railway vehicle, if the first confidence area overlays the second confidence area, the second accuracy measurement is less than the predetermined threshold and the first accuracy measurement is greater than the predetermined threshold;
  a low weight is assigned to the knowing of the actual location of the railway vehicle, if one of the confidence areas overlays the other confidence area, and the second accuracy measurement is greater than the predetermined threshold;
  a very low weight is assigned to the knowing of the actual location of the railway vehicle, if the confidence areas overlay partially, and both accuracy measurements are greater than the predetermined threshold.

According to one embodiment of the invention, the step of assigning of a weight of confidence further comprises comparing a track map with the first and the second confidence areas.

According to one embodiment of the invention, each of the first and the second confidence areas is formed by a circle.

According to one embodiment of the invention, the radius of the each circle is defined by the corresponding accuracy measurement.

According to one embodiment of the invention, each of the first and the second accuracy measurements corresponds to a horizontal dilution of precision of the corresponding navigation module.

According to one embodiment of the invention, each navigation module receives navigation signals from a Global Navigation Satellite System (GNSS).

According to one embodiment of the invention, the regular resolution position is obtained using publically available encrypting codes.

According to one embodiment of the invention, the high resolution position is obtained using encrypting codes with a restricted access.

According to one embodiment of the invention, the high resolution position is obtained using additional satellites or ground stations.

According to one embodiment of the invention, the method further comprises a preliminary step comprising converting the regular resolution position and the high resolution position so as these positions correspond to a same location, the conversion is performed using a known distance between the first navigation module and the second navigation module. The invention concerns also a system for determining the location of a railway vehicle comprising a first navigation module and a second navigation module, each navigation module receiving navigation signals from a global navigation satellite system;

the first navigation module determining a regular resolution position of the railway vehicle with a first accuracy measurement, using the received signals;

the second navigation module determining a high resolution position of the railway vehicle with a second accuracy measurement, using the received signals;

wherein the system is configured for:

determining a first confidence area around the regular resolution position, based on the first accuracy measurement;

determining a second confidence area around the high precision position, based on the second accuracy measurement;

assigning a weight of confidence to the knowing of the actual location of the railway vehicle, by analyzing the overlay of the first and the second confidence areas and the first and the second accuracy measurements.

BRIEF DESCRIPTION OF THE DRAWINGS

The aforementioned advantages and features of the present invention will be better understood with reference to the following detailed description and the accompanying drawings in which.

DETAILED DESCRIPTION OF THE INVENTION

Figure 1:
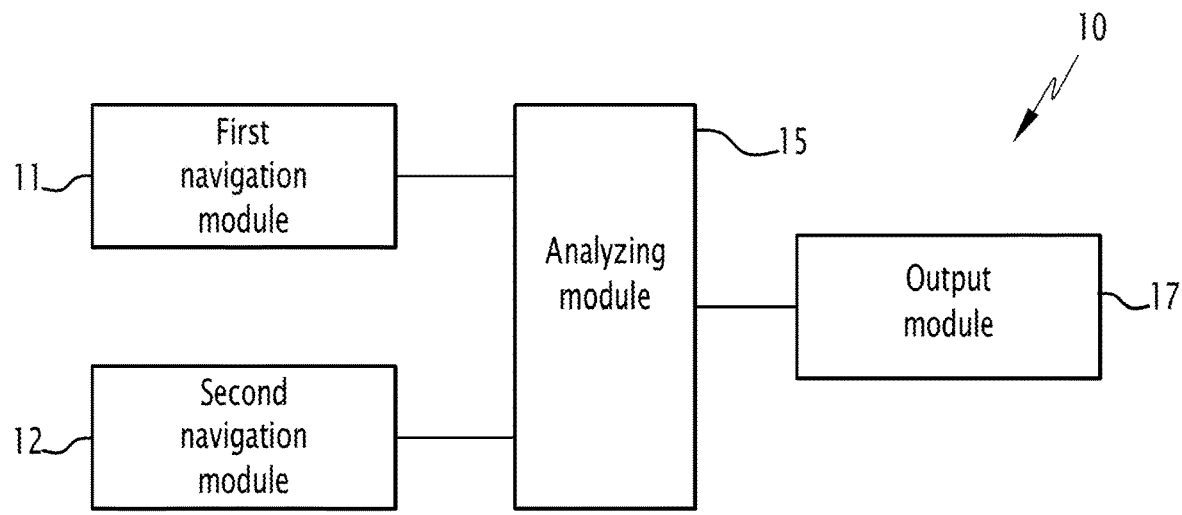
FIG. 1 is a block diagram of a system for determining the location of a railway vehicle, according to one embodiment of the invention.

Referring to FIG. 1, a system 10 for determining the location of a railway vehicle, called hereinafter determining system 10, comprises a first navigation module 11, a second navigation module 12, an analyzing module 15 and an output module 17.

According to one embodiment of the invention, the railway vehicle is a locomotive travelling on a track of a single track or multitrack railway system comprising several parallel tracks. According to another embodiment of the invention, the railway vehicle is a metro or any other vehicle travelling on a track of a single track or a multitrack railway system.

According to the preferred embodiment of the invention, the determining system 10 makes part of onboard equipment of the railway vehicle.

Each navigation module 11, 12 is a receiver configured to receive and decode navigation signals issued from a global navigation satellite system called GNSS. According to the preferred embodiment of the invention, each navigation module 11, 12 is configured to receive and decode navigation signals issued from a GNSS, preferably from the Global Positioning System known as GPS, but can be a mixture of systems like GPS, GLONASS (Global Navigation Satellite System), Galileo, Beidou, etc.

However, it should be comprised that the invention is not restricted only on GPS receivers. Thus, for example, according to one embodiment of the invention, the first navigation module 11 is a GPS receiver and the second navigation module 12 is a GLONASS or Galileo receiver. According to another embodiment of the invention, each navigation module 11, 12 is configured to simultaneously receive and decode navigation signals issued from several GNSSs, for example, from GPS and GLONASS. According to another embodiment of the invention, each navigation module 11, 12 is configured to simultaneously receive and decode navigation signals issued from a GNSS and from another navigation system, for example a ground navigation system situated in the vicinity of the track.

Each navigation module 11, 12 is configured to determine the railway vehicle position and a geometric uncertainty of this position known as "dilution of precision" or DOP in the art. Particularly, as it is known in the art, the DOP has a horizontal component called "horizontal dilution of precision" or HDOP.

According to the invention, the first and the second navigation modules 11, 12 are configured to determine the position of the railway vehicle with different resolutions. Thus, for example, the first navigation module 11 is configured to determine a regular resolution position of the railway vehicle with a first accuracy measurement, using an appropriate decoding of the received signals, and the second navigation module 12 is configured to determine a high resolution position of the railway vehicle with a second accuracy measurement, using an appropriate decoding of the received signals.

According to the preferred embodiment of the invention, the regular resolution position is obtained by the first navigation module 11 using publically available encrypting codes and the high resolution position is obtained by the second navigation module 12 using encrypting codes with a restricted access and/or using additional private satellites or ground stations able to determine the position of this module 12. For example, when the navigation signals are issued from GPS for both navigations modules 11, 12, the publically available encrypting codes are known as coarse/acquisition (C/A) codes and the encrypting codes with a restricted access are known as precise (P(Y)) codes.

According to the preferred embodiment of the invention, the first and the second accuracy measurements correspond to the HDOPs respectively of the first and the second navigation modules 11, 12.

The first and the second navigation modules 11, 12 are situated in known positions of the railway vehicle so as the distance between these modules is known.

As it is illustrated on FIG. 1, both navigation modules 11, 12 are connected to the analyzing module 15. Thus, the analyzing module 15 is configured to receive the regular resolution and the high resolution positions determined respectively by the first and the second navigation modules 11, 12 as well as the corresponding accuracy measurements, and analyze this data as it will be explained below.

According to one embodiment of the invention, the analyzing module 15 is further connected to a database comprising a track map. Thus, the analyzing module 15 is further configured to analyze data issued form the track map.

According to one embodiment of the invention, the analyzing module 15 forms a computer program executable by an existing onboard computer. According to another embodiment of the invention, the analyzing module 15 forms an independent onboard computer comprising a processor, a memory and all other components for executing computer programs. According to another embodiment of the invention, the analyzing module 15 forms a Field-Programmable Gate Array (known as FPGA) or any other programmable logic device embedded to the railway vehicle. According to another embodiment of the invention, the analyzing module 15 forms a remote computer program or a remote computer or a remote programmable logic device. In this last case, the analyzing module 15 is connected to the first and the second navigation modules 11, 12 via for example an appropriate wireless connection.

The output module 17 is connected to the analyzing module 15 and forms for example a human-computer interface configured to present for example to a train driver or to a traffic controller the analysis results issued from the analyzing module 15.

According to another embodiment, the output module 17 is connected to the analyzing module 15 and forms for example a computer-to-computer interface configured to forward the information into other systems onboard the locomotive.

Figure 2:
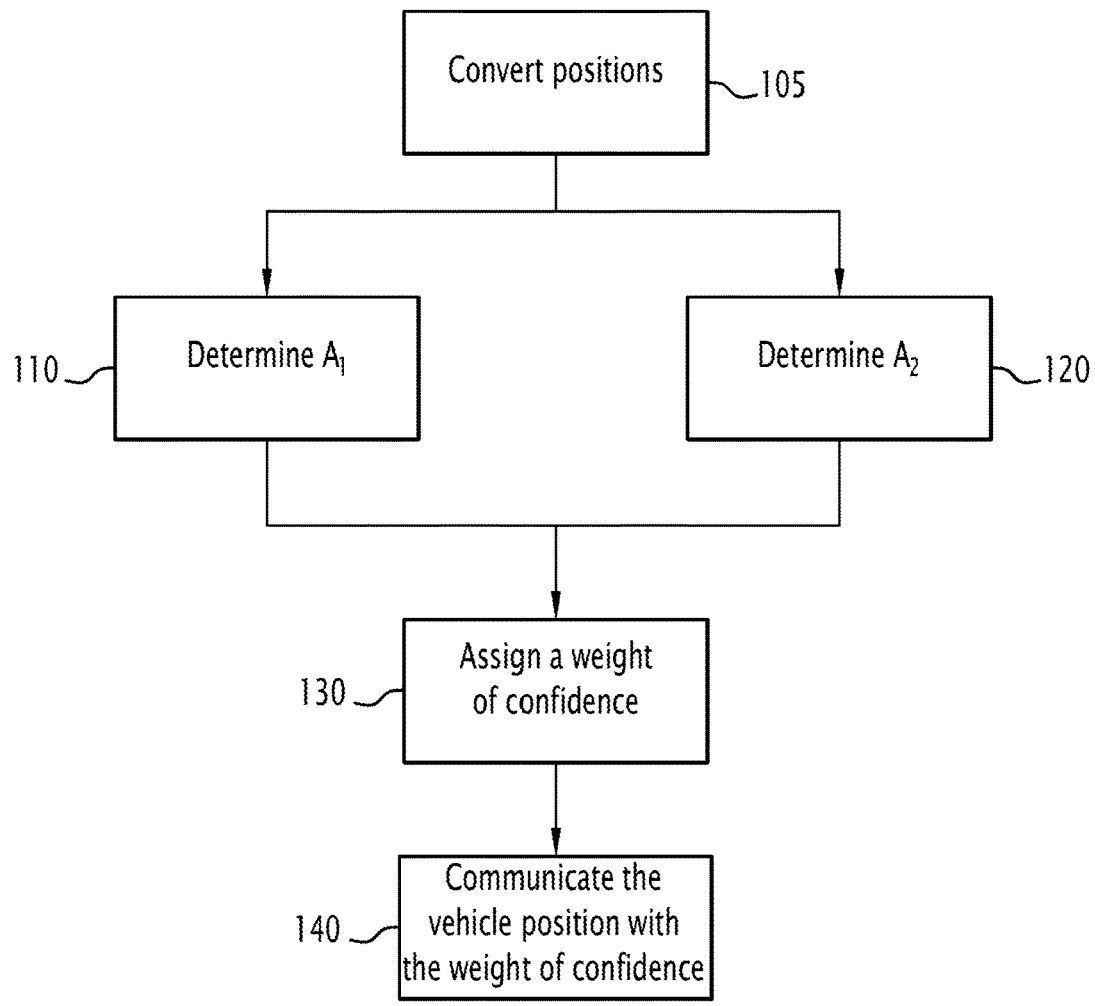
FIG. 2 is a flowchart of steps of a method for determining the location of a railway vehicle, according to one embodiment of the invention.

The method for determining the location of the railway vehicle implemented by the determining system 10 will now be explained in reference to FIG. 2 presenting a flowchart of its steps.

Initially, the railway vehicle travels on one of the tacks of the multitrack system. This track is for example associated to a reference number on the associated track map.

At any instant during the movement of the railway vehicle, the first and the second navigation modules 11, 12 determine respectively a regular and a high resolution positions of the railway vehicle with the corresponding accuracy measurements as it is explained above.

Further, the first and the second navigation modules 11, 12 transmit the determined positions to the analyzing module 15.

At step 105, the analyzing module 15 first converts the determined positions so as these positions correspond to a same location. This conversion is done using the known distance between the first and the second navigation modules 11, 12.

According to another embodiment of the invention, step 105 is performed after steps 110 and 120.

At step 110, the analyzing module 15 determines a first confidence area $A_1$ around the regular resolution position, based on the first accuracy measurement. In particular, according to one embodiment of the invention, the first confidence area $A_1$ corresponds to a circle of radius equal to the first accuracy measurement and with the center placed at the point corresponding to the regular resolution position.

At step 120, implemented for example in parallel with step 110, the analyzing module 15 determines a second confidence area $A_2$ around the high resolution position, based on the second accuracy measurement. In particular, according to one embodiment of the invention, the second confidence area $A_2$ corresponds to a circle of radius equal to the second accuracy measurement and with the center placed at the point corresponding to the high resolution position.

At step 130, the analyzing module 15 assigns a weight of confidence to the knowing of the actual location of the railway vehicle, by analyzing the overlay of the first and the second confidence areas $A_1$, $A_2$ and the first and the second accuracy measurements.

Thus, the weight of confidence represents a level of certainty of the knowing of the actual location of the railway vehicle. The weight of confidence can be thus characterized by a digital scale or by any other appropriate form. In the example recited below, the weight of confidence is characterized by wordings "very high", "high", "low" and "very low" but other examples are possible.

Thus, for example, a very high weight is assigned to the knowing of the actual location of the railway vehicle, if the first confidence area $A_1$ overlays the second confidence area $A_2$, and both accuracy measurements are less than a predetermined threshold. When the accuracy measurements are presented by the corresponding HDOPs, the predetermined threshold is comprised for example between 0 and 2.

Figure 3:
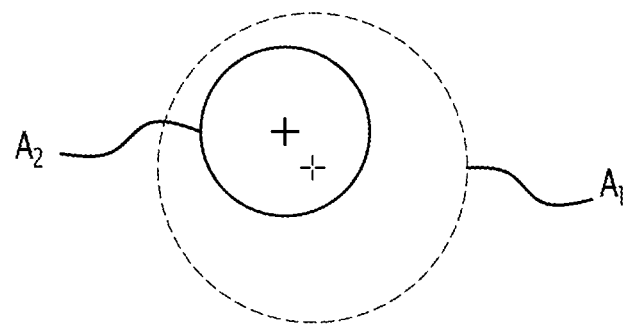
FIGS. 3 to 6 are different illustrations explaining one step of the method of FIG. 2.

Such case is illustrated on FIG. 3 in which the border of the first confidence area $A_1$ is presented by the dashed line and the border of the second confidence area $A_2$ is presented by the continuous line.

Figure 4:
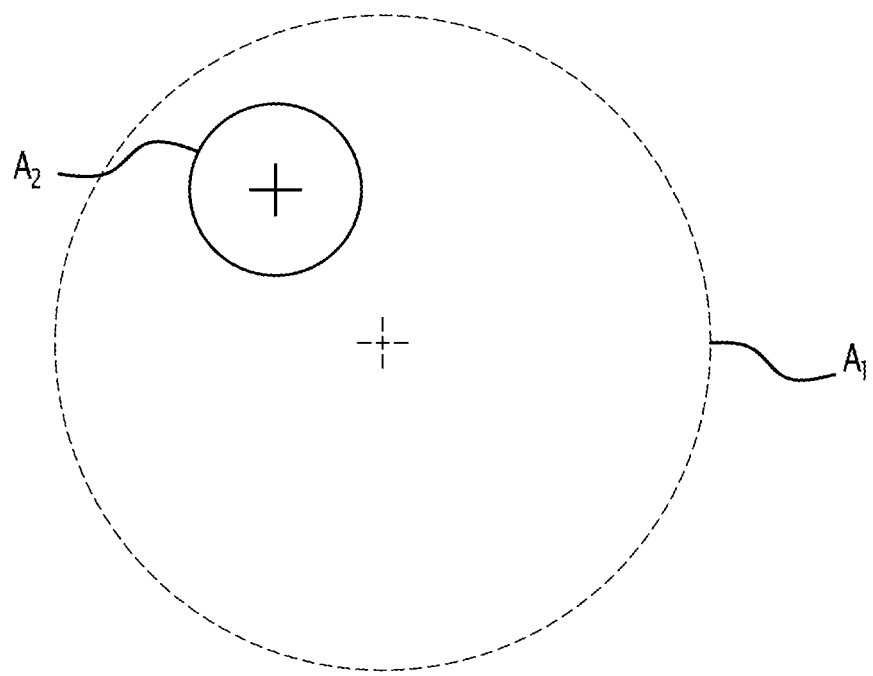

A high weight is assigned to the knowing of the actual location of the railway vehicle, if the first confidence area $A_1$ overlays the second confidence area $A_2$, the second accuracy measurement is less than the predetermined threshold and the first accuracy measurement is greater than the predetermined threshold. Such case is illustrated on FIG. 4 with analogous notations that in the previous case.

Figure 5:
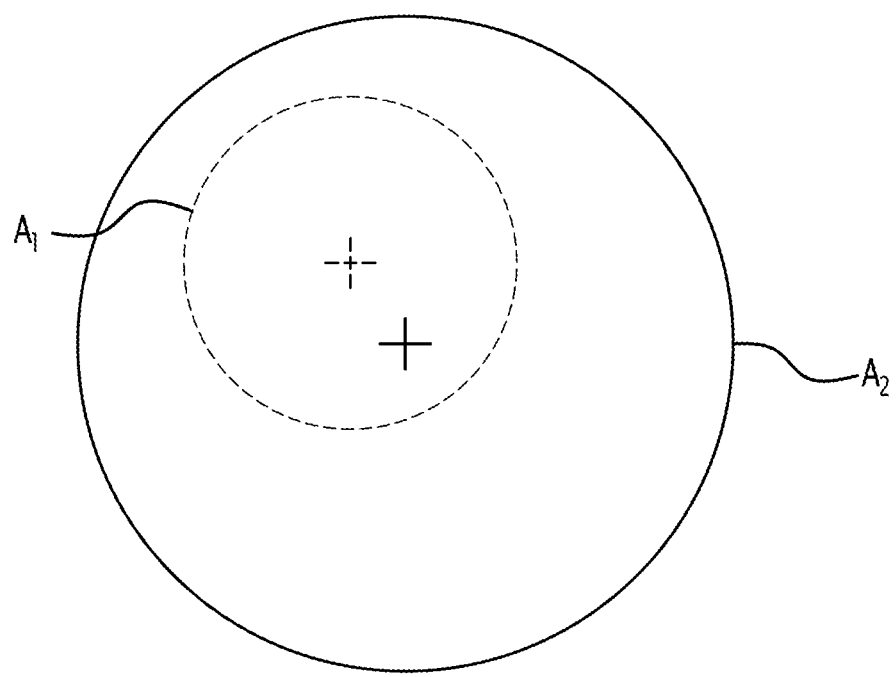

A low weight is assigned to the knowing of the actual location of the railway vehicle, if one of the confidence areas $A_1$, $A_2$ overlays the other confidence area, and the second accuracy measurement is greater than the predetermined threshold. Such case is illustrated on FIG. 5 with analogous notations that in the previous cases. In this case, the second confidence area $A_2$ overlays the first confidence area $A_1$.

Figure 6:
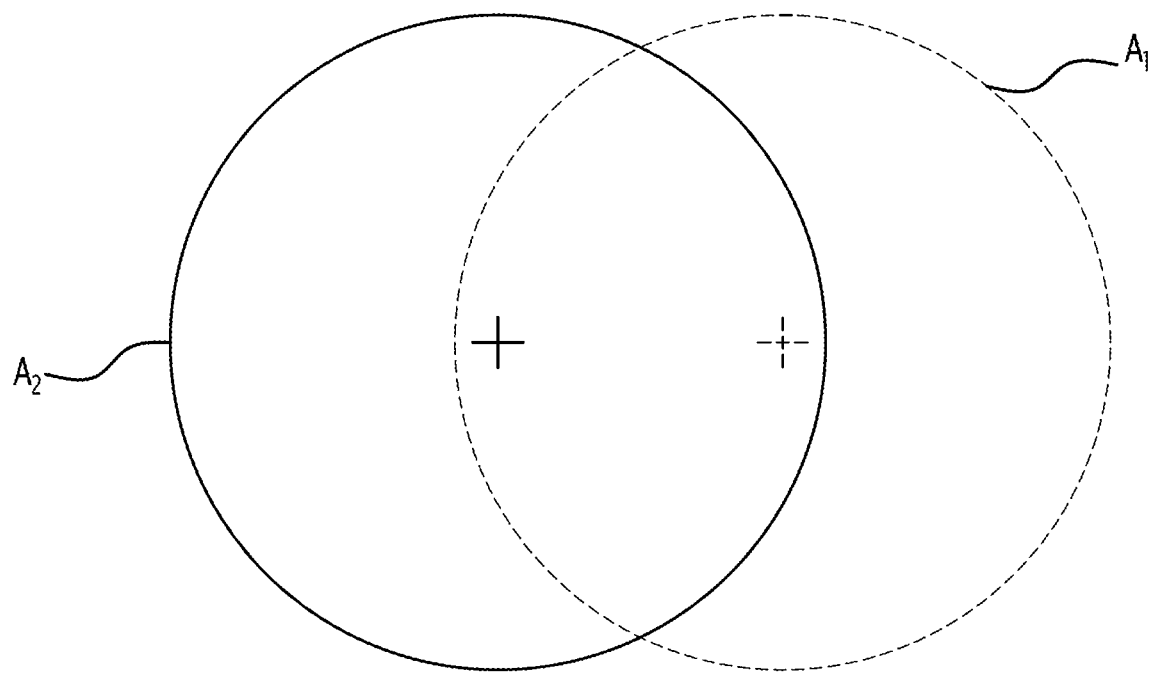

A very low weight is assigned to the knowing of the actual location of the railway vehicle, if the confidence areas $A_1$, $A_2$ overlay partially, and both accuracy measurements are greater than the predetermined threshold. Such case is illustrated on FIG. 6 with analogous notations that in the previous cases.

Additionally, according to one embodiment of the invention, at step 130, the analyzing module 12 further analyzes the track map in order to assign a weight of confidence to the knowing of the actual location of the railway vehicle. For example, in the case illustrated on FIG. 3, a high weight of confidence is assigned when only one track passes by the second confidence area $A_2$ according to the track map. Other examples are also possible.

At step 140, the output module 17 communicates for example to the traffic controller a result position of the railway vehicle or the reference number of the corresponding track according to the track map, with the corresponding weight of confidence.

The result position is for example the high resolution position determined by the second navigation module 12. According to another embodiment of the invention, the result position is determined depending on the regular resolution position and the high resolution position.

It can be seen that the invention presents a certain number of advantages. Particularly, the invention makes it possible to determine the exact location of the railway vehicle, i.e. with a high precision, even in a multitrack system using only two navigation modules, one providing a regular resolution position and the other providing a high resolution position.

Between these two positions, only the high resolution position is obtained with some additional costs, the regular resolution position being obtained using publically available navigation signals. Consequently, the invention reduces the global cost of the railway vehicle exploitation and assures the operating of the vital applications.

The invention claimed is:

1. A method for determining an actual location of a railway vehicle comprising a first navigation module and a second navigation module, each navigation module receiving navigation signals from a global navigation satellite system; the first navigation module determining a regular resolution position of the railway vehicle with a first accuracy measurement, using the received navigation signals; the second navigation module determining a high resolution position of the railway vehicle with a second accuracy measurement, using the received navigation signals; the method comprising the following steps:

providing an estimation of the actual location of the railway vehicle;

determining a first confidence area around the regular resolution position, based on the first accuracy measurement;

determining a second confidence area around the high precision position, based on the second accuracy measurement;

assigning a weight of confidence to the estimation of the actual location of the railway vehicle, by analyzing the overlay of the first and the second confidence areas and the first and the second accuracy measurements; and communicating the weight of confidence with the estimation of the actual location of the railway vehicle.

2. The method according to claim 1, wherein during the step of assigning of a weight of confidence, a very high weight is assigned to the estimation of the actual location of the railway vehicle, if the first confidence area overlays the second confidence area, and both accuracy measurements are less than a predetermined threshold;

a high weight is assigned to the estimation of the actual location of the railway vehicle, if the first confidence area overlays the second confidence area, the second accuracy measurement is less than the predetermined threshold and the first accuracy measurement is greater than the predetermined threshold;

a low weight is assigned to the estimation of the actual location of the railway vehicle, if one of the confidence areas overlays the other confidence area, and the second accuracy measurement is greater than the predetermined threshold;

a very low weight is assigned to the estimation of the actual location of the railway vehicle, if the confidence areas overlay partially, and both accuracy measurements are greater than the predetermined threshold.

3. The method according to claim 1, wherein the step of assigning a weight of confidence further comprises comparing a track map with the first and the second confidence areas.

4. The method according to claim 1, wherein each of the first and the second confidence areas is formed by a circle.

5. The method according to claim 4, wherein the radius of the each circle is defined by the corresponding accuracy measurement.

6. The method according to claim 1, wherein each of the first and the second accuracy measurements corresponds to a horizontal dilution of precision of the corresponding navigation module.

7. The method according to claim 1, wherein each navigation module receives navigation signals from a Global Positioning System (GPS).

8. The method according to claim 7, wherein the regular resolution position is obtained using publically available encrypting codes.

9. The method according to claim 8, wherein the high resolution position is obtained using encrypting codes with a restricted access.

10. The method according to claim 8, wherein the high resolution position is obtained using additional satellites or ground stations.

11. The method according to claim 1, further comprising a preliminary step comprising converting the regular resolution position and the high resolution position so as these positions correspond to a same location, the conversion is performed using a known distance between the first navigation module and the second navigation module.

12. A system for determining an actual location of a railway vehicle comprising a first navigation module and a second navigation module, each navigation module receiving navigation signals from a global navigation satellite system; the first navigation module determining a regular resolution position of the railway vehicle with a first accuracy measurement, using the received navigation signals; the second navigation module determining a high resolution position of the railway vehicle with a second accuracy measurement, using the received navigation signals; wherein the system comprises an analyzing module configured for:

providing an estimation of the actual location of the railway vehicle;

determining a first confidence area around the regular resolution position, based on the first accuracy measurement;

determining a second confidence area around the high precision position, based on the second accuracy measurement;

assigning a weight of confidence to the estimation of the actual location of the railway vehicle, by analyzing the overlay of the first and the second confidence areas and the first and the second accuracy measurements; and communicating the weight of confidence with the estimation of the actual location of the railway vehicle.

* * * * *